United States Patent
Bahler et al.

(10) Patent No.: US 6,876,987 B2
(45) Date of Patent: Apr. 5, 2005

(54) AUTOMATIC CONFIRMATION OF PERSONAL NOTIFICATIONS

(75) Inventors: Lawrence G. Bahler, San Diego, CA (US); Alan L. Higgins, San Diego, CA (US)

(73) Assignee: ITT Defense, Inc., McLean, VA (US)

( * ) Notice: Subject to any disclaimer, the term of this patent is extended or adjusted under 35 U.S.C. 154(b) by 294 days.

(21) Appl. No.: 09/772,651

(22) Filed: Jan. 30, 2001

(65) Prior Publication Data
US 2002/0103656 A1 Aug. 1, 2002

(51) Int. Cl.[7] .............................................. G06F 15/18
(52) U.S. Cl. ........................... 706/14; 706/12; 706/11
(58) Field of Search .............................. 706/11, 12, 14

(56) References Cited

U.S. PATENT DOCUMENTS

| | | | |
|---|---|---|---|
| 5,414,755 A | | 5/1995 | Bahler et al. |
| 5,794,204 A | * | 8/1998 | Miyazawa et al. ........... 704/275 |
| 5,825,871 A | * | 10/1998 | Mark .................... 379/357.03 |
| 5,893,057 A | * | 4/1999 | Fujimoto et al. ........... 704/246 |
| 5,920,838 A | * | 7/1999 | Mostow et al. ............. 704/255 |
| 5,937,381 A | | 8/1999 | Huang et al. |

* cited by examiner

Primary Examiner—Anthony Knight
Assistant Examiner—Joseph P. Hirl
(74) Attorney, Agent, or Firm—Wilmer Cutler Pickering Hale and Dorr LLP

(57) ABSTRACT

An automated system obtains a confirmation of receipt of a notification by the intended recipient by having the recipient speak all or part of the notification. The words spoken by the recipient are determined by a computerized system using an automatic speech recognition algorithm. The computerized system determines whether the words spoken are those of the notification, and if they are, the system accepts the confirmation from the recipient. Optionally, the system additionally applies an automatic speaker recognition algorithm to determine whether the person reciting the notification has similar voice characteristics to the intended recipient based on a previous enrollment of the intended recipient's voice. The system can also record the recipient reciting the notification so that it can later be compared to the intended recipient's voice if the intended recipient repudiates the confirmation.

16 Claims, 8 Drawing Sheets

AUTOMATIC CONFIRMATION OF PERSONAL NOTIFICATIONS

BACKGROUND

This invention relates to automatic confirmation of recipient of a personal notification.

It is often desirable to deliver a notification to an intended recipient and then to obtain a confirmation that the intended recipient has indeed received and read the content of the notification. Receipt of such confirmation may be needed, for example, in various legal or safety related applications. In such applications, it may be desirable that the recipient cannot easily repudiate receiving or reading the notification. An example of a notification is delivery of information to an employee that is critical to the performance of that employee's job.

Various approaches to delivery of the notification and obtaining the confirmation have been used in the past. A first traditional approach involves providing the notification in writing to the intended recipient. The recipient then signs a written confirmation that states that he or she has received and read the notification, and returns the signed confirmation to the original sender. The original sender of the notification can compare the signature on the confirmation to a signature of the intended recipient that the sender has previously obtained. This exchange of written documents can be performed, for example, by written mail. Related approached involve other modes of delivery of the notification, such as by electronic mail, web page, or facsimile. In these related approaches, the signed confirmation is then returned in written form by mail or by facsimile.

Another approach, which avoids some of the disadvantages of handling a paper confirmation, uses an electronic delivery approach for both the notification and the confirmation, for example, using electronic mail. In order to verify that the confirmation was sent by the intended recipient, the recipient can electronically "sign" the confirmation. For example, public-key cryptography is used to sign the confirmation such that only someone who knew the private key of the recipient could have sent the confirmation. In other related approaches, the recipient provides a password or other private information, such as his or her mother's maiden name, in a client-server computer architecture in which the server receives the private information from the remote client. For example, a World-Wide-Web (WWW; Web) based application may deliver the notification over the Internet, and the recipient provides private information to the application to confirm that the intended recipient truly received the notification.

In another approach to confirmation, the recipient makes direct contact with a human agent, for example, by placing a telephone call. The agent obtains private information from the recipient to determine that the intended recipient has received the notification.

In some applications of electronic delivery of notifications, a user of a computer system may be asked to view a text notification, such as the terms of an agreement, on a computer monitor, and then to select an "accept" button, for example using a mouse, to confirm that they have read the notification. In some such applications, the user are required to scroll through the entire notification as further evidence that they have read the entire notification prior to being allowed to select the "accept" button.

SUMMARY

Previously used approaches to obtaining confirmations of notifications have one or more of a number of limitations. One limitation is that the confirmation may not positively demonstrate that the recipient actually has read or was otherwise made aware of the entire notification. For example, the user may simply sign a written confirmation or electronically "accept" a long text notification without actually reading the entire notification. In such a situation, the intended recipient may confirm that they received the notification, but later deny that they actually were aware of the entire content of the notification. In approaches based on a recipient providing private information or digit ally signing a confirmation message, the intended recipient may later repudiate the confirmation and assert that he or she did not send the confirmation. For example, the intended recipient may claim that the private information, such as a password, must have been compromised and provided by another recipient.

In a general aspect, the invention addresses obtaining a confirmation of receipt of a notification by the intended recipient by having the recipient speak all or part of the notification. The words spoken by the recipient are determined by a computerized system using an automatic speech recognition algorithm. The computerized system determines whether the words spoken are those of the notification, and if they are, the system accepts the confirmation from the recipient. Optionally, the system additionally applies an automatic speaker recognition algorithm to determine whether the person reciting the notification has similar voice characteristics to the intended recipient based on a previous enrollment of the intended recipient's voice. The system can also record the recipient reciting the notification so that it can later be compared to the intended recipient's voice if the intended recipient repudiates the confirmation.

In a first aspect, in general, the invention is a method for confirming receipt of a notification. The notification includes a word sequence that is presented to a recipient of the notification. An audio response is accepted from the recipient in response to presenting the word sequence. Then the accepted audio input is processed to determine whether it includes the recipient speaking the word sequence.

The method can include one or more of the following features:

The method additionally includes determining whether the accepted audio input includes the voice of an intended recipient.

Presenting the word sequence to the recipient includes presenting a graphical representation of the word sequence.

Presenting the graphical representation of the word sequence includes presenting the graphical representation on a display.

Presenting the word sequence to the recipient includes presenting an audible representation of the word sequence.

Presenting the audible representation of the word sequence includes playing a stored audio recording of the word sequence.

Presenting the audible representation of the word sequence includes applying a speech synthesis algorithm to the word sequence to form the audible representation.

Presenting the audible representation of the word sequence includes transmitting the audible representation over a telephone network and accepting the audio response includes receiving the audio response over the telephone network.

Determining whether the accepted audio input includes the recipient speaking the word sequence includes applying a speech recognition algorithm to the accepted audio input.

Applying the speech recognition algorithm includes computing a resulting word sequence from the audio input and determining whether the audio input includes the recipient speaking the word sequence includes comparing the spoken word sequence to the word sequence of the notification.

Applying the speech recognition algorithm includes time-aligning the word sequence of the notification and the audio input.

Applying the speech recognition algorithm includes computing a match score characterizing a similarity between the word sequence and the audio input.

Determining whether the audio input includes the recipient speaking the word sequence includes comparing the match score with a threshold score.

Accepting the audio input includes accepting a number of segments of the audio input each associated with a different part of the word sequence of the notification, and wherein determining whether the accepted audio input includes the recipient speaking the word sequence includes determining whether each of the segments of the audio input includes the recipient speaking the associated part of the word sequence.

Presenting the word sequence includes presenting each of the different parts of the word sequence in turn and accepting the audio input associated with that part before presenting another of the different parts.

In another aspect, in general, the invention is a method for forming a contract between a first party and a second party. Terms of the contract are offered to the second party. This includes presenting a word sequence to the second party. An audio input is accepted from the second party in response to offering the terms of the contract. Then, whether the accepted audio input includes the second party speaking the presented word sequence is determined. The first party is informed whether or not the audio input includes the second party speaking the word sequence.

Determining whether the accepted audio input includes the second party speaking the presented word sequence can include applying a speech recognition algorithm to the accepted audio input to determine a word sequence present in the audio input.

Determining whether the accepted audio input includes the second party speaking the presented word sequence can also include applying a speaker recognition algorithm to the accepted audio input to compare voice characteristics of an intended party with whom the first party desires to form a contract and voice characteristics present in the audio input.

Offering the terms of the contract can include displaying a text representation of the terms to the second party on a computer display.

In another aspect, in general, the invention is software stored on computer readable media for causing a computer system to perform a number of functions. These functions include: presenting a notification to a recipient of the notification, including presenting a word sequence to the recipient; accepting an audio input in response to presenting the word sequence; and determining whether the accepted audio input includes the recipient speaking the word sequence. The functions can further include determining whether the accepted audio input includes the voice of an intended recipient.

The invention has one or more of the following advantages.

By determining that the recipient recited the words of the notification, the recipient cannot easily deny that they were not aware of the specific text of the notification. For instance, a user of a computer system may more easily claim that they did not read a notification before they pressed "I accept", or before they scrolled through a long agreement.

Another advantage is that when combined with automatic speaker recognition techniques, the system can determine that the intended recipient is highly likely to be the individual who provided the confirmation. This avoids a problem with use of private information that must be known not to have been compromised or provided to someone else.

Other features and advantages of the invention are apparent from the following description, and from the claims.

DESCRIPTION

Figure 1:
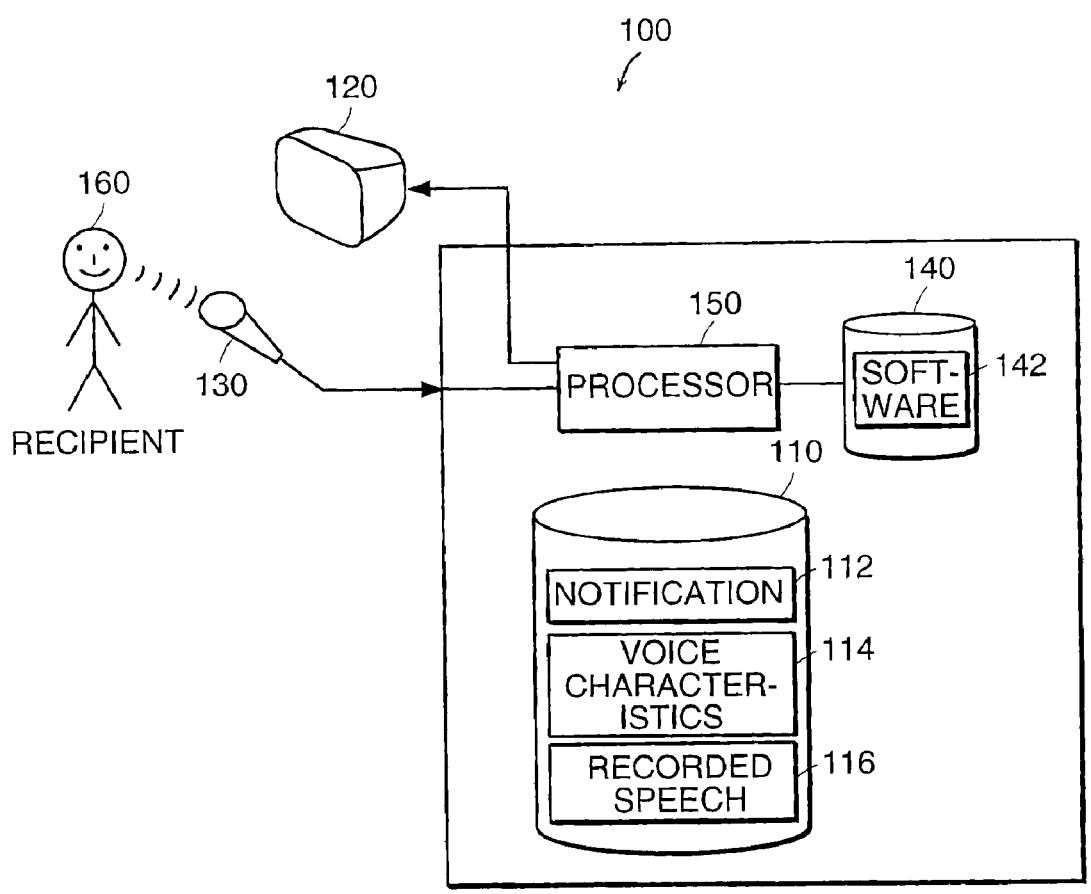
FIG. 1 is a block diagram of a computer implementation of the invention.
Figure 2:
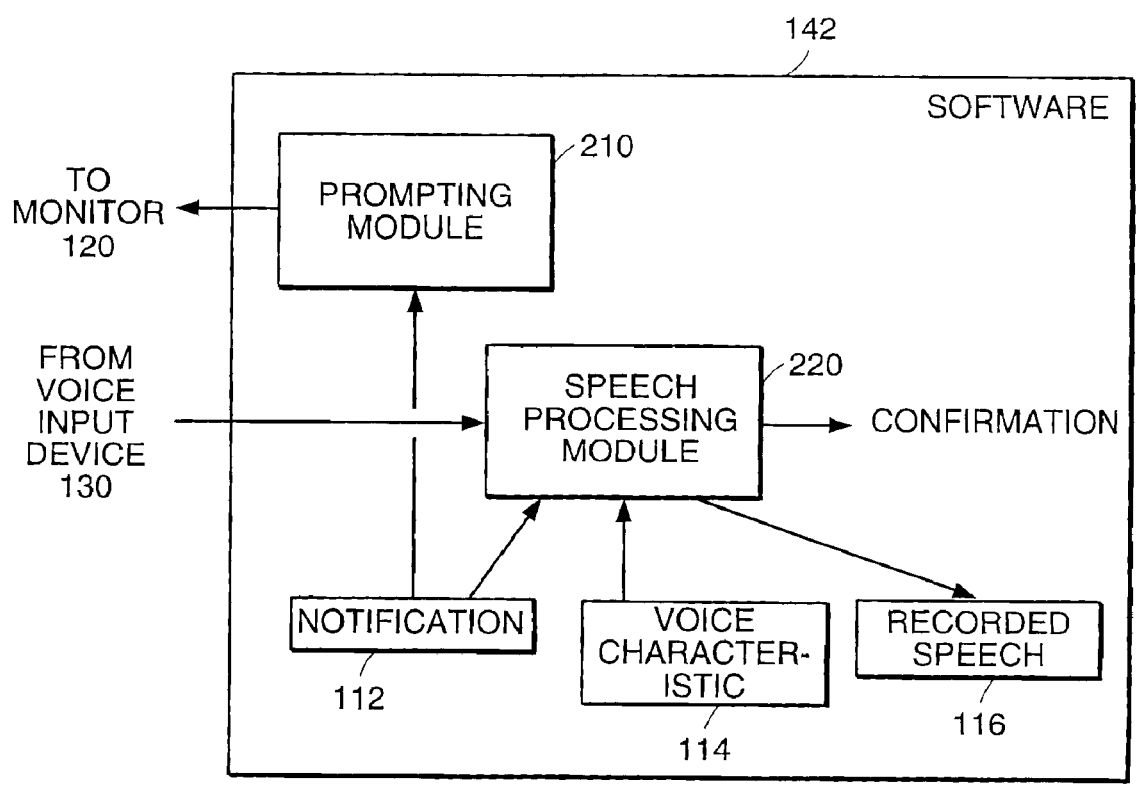
FIG. 2 is a block diagram of software modules that implement the system.

Referring to FIG. 1, in a first embodiment of the invention, a computer system 100 provides a graphical and audio interface to a recipient 160. Computer system 100 includes a storage 110 that holds a notification 112. Computer system 100 also includes a display 120, such as a CRT, for presenting textual information to recipient 160, and an audio input device 130, such as a microphone and signal digitization hardware, for accepting an acoustic signal produced when the recipient speaks. Computer system 100 also includes a storage 140, such as a magnetic or optical disk, for holding software 142 that is executed on a processor 150 in the computer system. This software implements a number of software modules that implement the system, and which are described in detail below. Storage 110 optionally includes voice characteristic data 114, which characterizes the speech of the intended recipient, and may also include a recorded speech 116, which is recorded by the system as it accepts input speech from the recipient Referring to FIG. 2, software 142 includes a number of modules, including a prompting module 210 and a speech-processing module 210. Prompting module 210 makes use of notification 112 for presenting text-based prompts to recipient 160 using display 120. Speech processing module 220 received digitized audio input from audio input device 130 and makes use of notification 112 to determine whether the recipient actually read the notification out loud and if so, provides a confirmation to another software module, such as an application program executing on computer system 100 or on another remote computer. Speech processing module 220 also optionally makes use of voice characteristics data 114 to determine whether the intended recipient truly spoke the confirmation. Speech processing module 220 also optionally records the recipient's speech into recorded speech 116.

Figure 3:
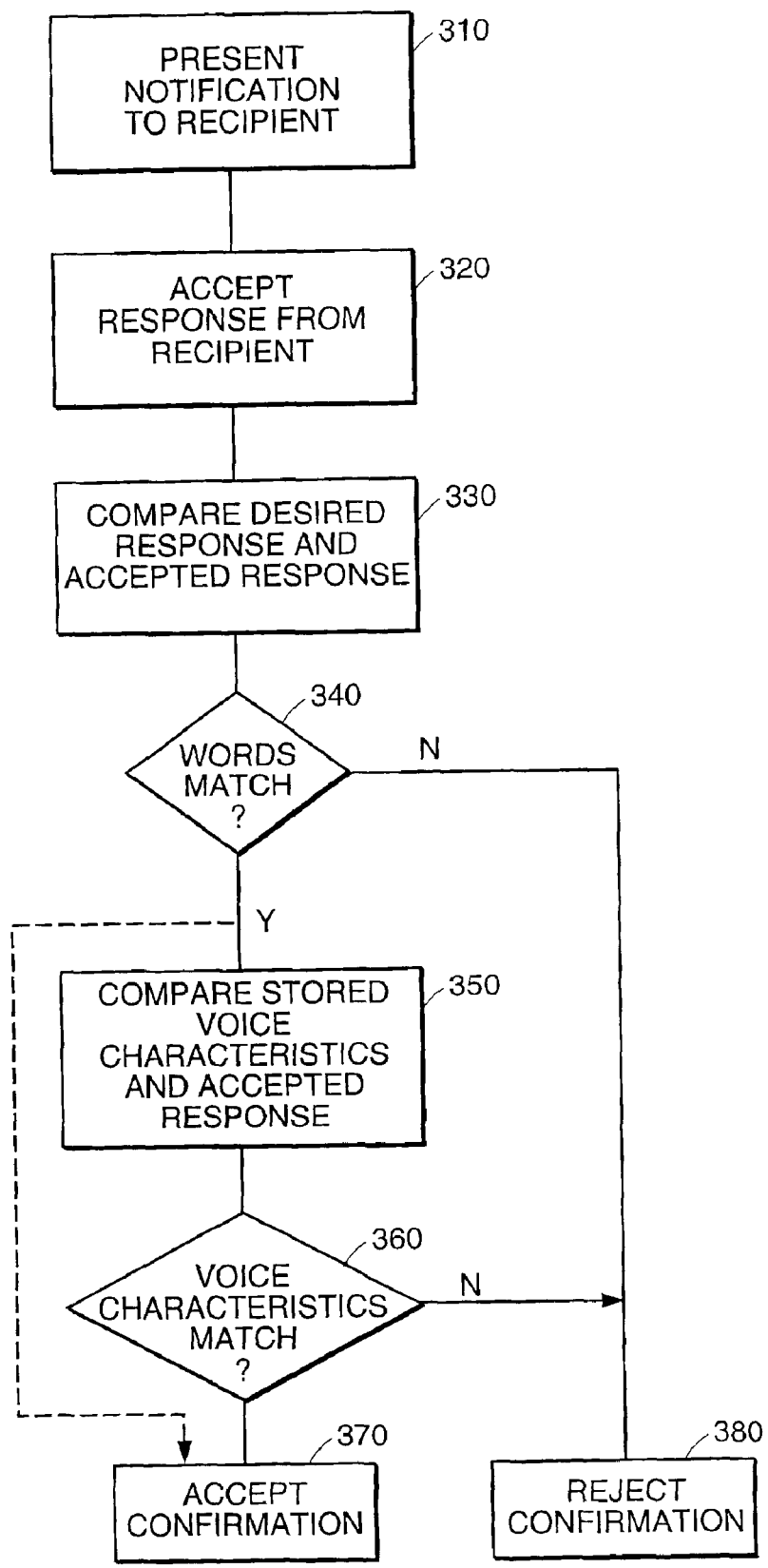
FIG. 3 is a flowchart of operation of the system.

Referring to FIG. 3, an operational scenario controlled by software 142 involves a series of steps. First, prompting module 210 presents accesses notification 112 and presents the notification text, which is a word sequence that forms part or all of the notification, to the recipient on display 120 (step 310). The recipient is instructed, for instance with text instructions on the display, to read the notification text. The recipient reads the notification text and speech processing module 220 accepts the audio response, which includes the recipient reading the notification text, through audio input device 130 (step 320).

Speech processing module 220 implements a word matching algorithm based on speech recognition techniques for determining whether the audio response actually contains the notification text. In this first embodiment, the matching algorithm involves applying a speaker-independent speech recognizer to the audio response and then comparing the resulting word sequence with the notification text (step 340). If the resulting word sequence and the notification text are not the same, then the system rejects the confirmation (step 380). Optionally (not shown in FIG. 3), the process of accepting the audio input and comparing the resulting word sequence to the notification next is repeated to give the recipient another opportunity if the resulting word sequence did not match. For example, the recipient may have misspoken, coughed, or spoken in the presence of a loud background noise, possibly resulting in a speech recognition error. Various alternative related word algorithms are used in alternative embodiments, which are described further below.

If the audio response matches the notification text, speech processing module 220 optionally implements a voice matching algorithm that compares a stored voice characteristic of the intended recipient, which was previously stored in voice characteristics 114, with the audio response (step 350). Various alternative algorithms, which are well known in the art of speaker verification, can be used to compare the audio response to the stored voice characteristics of the intended recipient. Several of these alternative algorithms are identified below. If the stored voice characteristics do not match the audio response (step 360), the system rejects the confirmation (step 380). Otherwise, the system accepts the confirmation (step 370).

In alternative embodiments, various word matching algorithms that are known to those skilled in the art of speech recognition are used. In the embodiment described above, the notification text is matched with the word output of a speech recognizer. Alternatively, the word matching algorithm uses the notification text to time-align the notification text to the audio input to determine whether the notification text was spoken. An example of such a time alignment algorithm can be found in B. Wheatley et al., "Robust Automatic Time Alignment of Orthographic Transcriptions with Unconstrained Speech," Intl. Conf. on Acoustics, Speech, and Signal Processing (ICASSP) 1992, p.I-533. In some embodiments, the word matching algorithm accepts audio input in which the recipient does not exactly and fluently speak the notification text. For example, the recipient may restart reading, include filled pauses ("ummmm"), cough, or otherwise does not exactly utter the notification text. In some embodiments, the word matching algorithm implements a scoring approach in which it computes a match score that characterizes the match between the audio input and the notification text. The match score can be related to a degree of acoustic match, or related to a likelihood or certainty that the recipient spoke the notification text. The score is then compared to a threshold to determine whether the audio input matches the notification text closely enough to be accepted. Alternatively, rather than computing a single match score for the entire notification text directly, multiple match scores each associated with different parts (e.g., words, phrases, or sentences) of the notification text are computed. These scores can each be compared to corresponding thresholds, or combined (e.g., arithmetically) before comparing to a threshold.

Various voice matching algorithms that are known to those skilled in the art of speaker recognition or speaker verification are alternatively used. Examples of such voice matching algorithms can be found in U.S. Pat. No. 5,414,755, "Passive Voice Monitoring in the Telephone Network" and in U.S. Pat. No. 5,937,381, "System for Voice Verification of Telephone Transactions." In one alternative embodiment, the notification text includes one or more words or phrases specifically designed for voice verification Use of such phrases can be used to improve the accuracy of the voice matching algorithm. For example, these words or phrases can be used for a text-dependent speaker verification approach in which the intended recipient previously spoke that phrase or its component words during an enrollment session. Alternative embodiments use text-independent speaker verification approaches in which the notification text does not necessarily include words and phrases in common with a prior enrollment by the intended recipient. The voice matching algorithm can generate a score related to the degree of acoustic match, or related to a likelihood or certainty that the recipient providing the audio input is truly intended recipient, and this score is compared to a threshold by the voice matching algorithm in determining whether to accept the confirmation.

In alternative embodiments, the notification text is not necessarily presented all at once. For instance with relatively long notification texts the presentation of the notification text and the accepting of audio input is optionally divided into segments. Alternative segment sizes include short phrase, single lines, or groups of a small number of lines that fit on a single display screen. The notification text of each segment is presented only after the audio input for the previous segments is input by the system. In another alternative, multiple segments are displayed at once but only one segment at a time is highlighted. In some alternative embodiments that make use of segmented notification text, the word matching and optional voice matching algorithms are applied to each segment before continuing, while in other alternative embodiments, the audio input for each segment is collected and only processed after the input for all the segments is collected.

In other alternative embodiments, notification text is presented as an audio prompt instead of, or in addition to, being presented as text on display 120. In one such embodiment, an audio recording of the notification text is played to the recipient. The recipient repeats the notification text after hearing it. In such an embodiment in which there is no corresponding text display of the notification, it is advantageous to break the notification text into segments so that the recipient can remember each segment to be repeated. In another such embodiment, the audio prompt of the notification text is generated using a text-to-speech synthesis system rather than using an audio recording.

Figure 4:
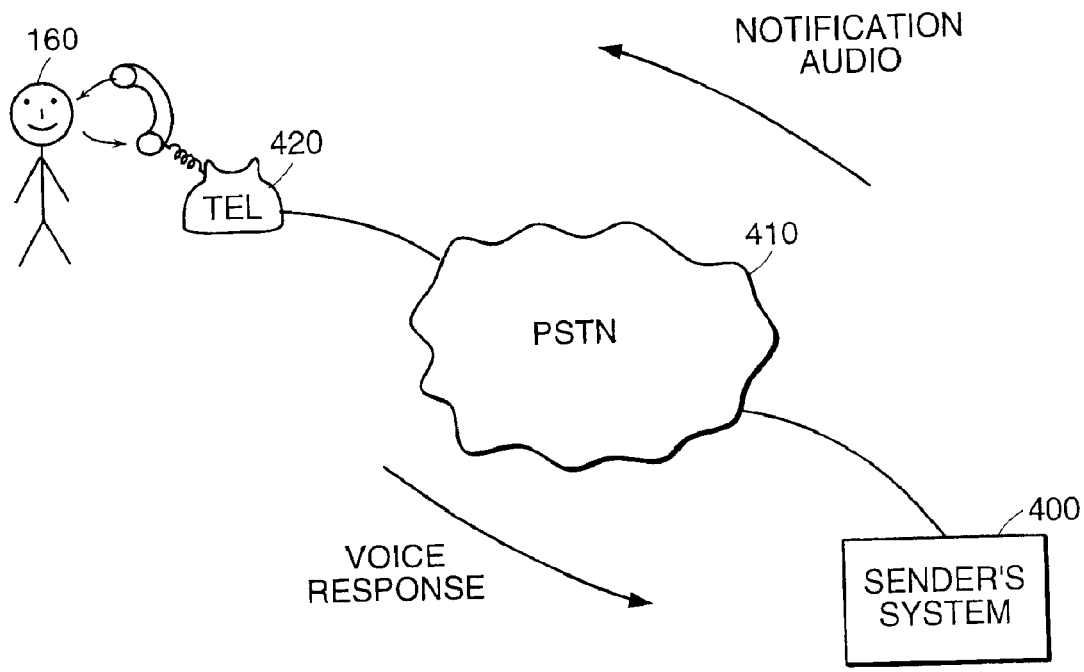
FIG. 4 is a block diagram of an embodiment that makes use of a telephone system to communicate with the recipient.

The functionality of computer system 100 (FIG. 1) can alternatively be split among distributed components. Referring to FIG. 4, in one distributed embodiment, a sender's system 400 places an outbound telephone call over the public switched telephone network (PSTN) 410 to a telephone 420. Recipient 160 answers the telephone. Sender's system 400 plays an audio version (recorded or synthesized) of the notification text to recipient 160, optionally in multiple segments as described above, and accepts the voice response from recipient 160. In this embodiment, telephone 420, PSTN 410, and telephone interface hardware at sender's system 400 essentially serve the function of audio input device 130 shown in FIG. 1. The approach shown in FIG. 4 can be applied in a wireless telephone network. In alternative embodiments in which telephone 410 supports a text display, sender's system 400 may send the notification text to the telephone for graphical display in addition to or instead of playing the audio version.

Figure 5A:
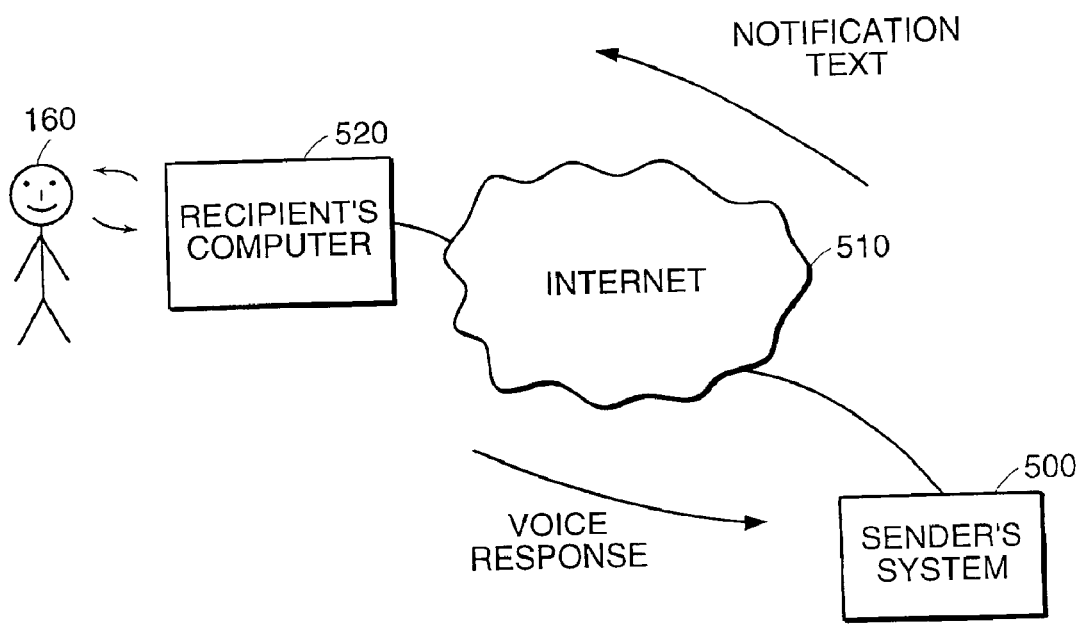
FIG. 5A is a block diagram of an embodiment that makes use of a data network, such as the Internet, to communicate with the recipient.
Figure 5B:
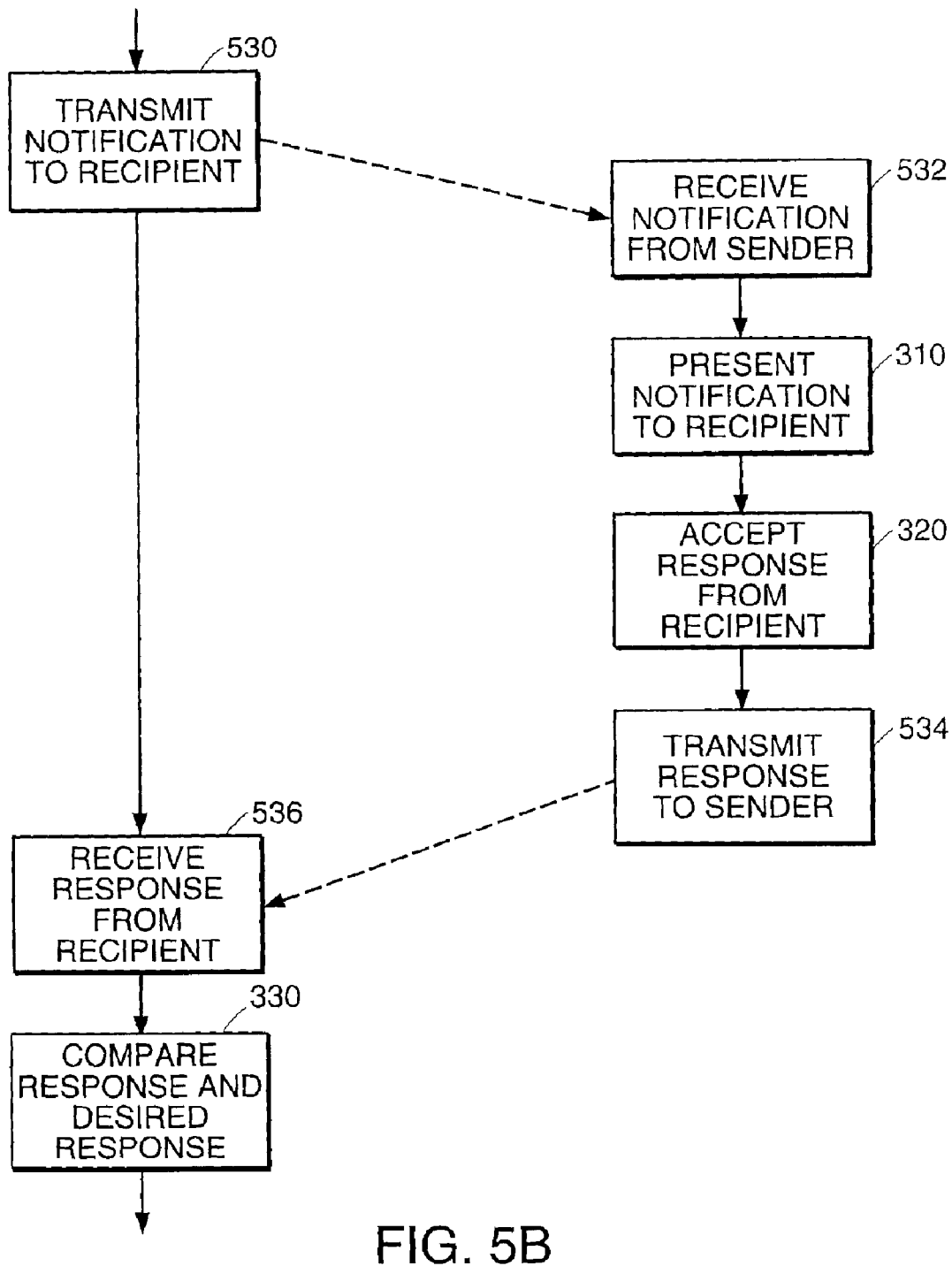
FIG. 5B is a flowchart of operation involving communication over a data network.

Referring to FIGS. 5A–B, in another distributed embodiment, a sender's system 500 is coupled by a data channel to a recipient's computer 520, in this embodiment, through a data network such as Internet 510. Referring to the flowchart in FIG. 5B, sender's system 500 passes the notification text to recipient's system 520 (step 530), where it is received (step 532) presented to recipient 160 (step 310). Recipient's system 520 includes hardware to accept the audio input of the recipient speaking. Recipient's system 520 accepts the audio response from the recipient (step 32) and passes the digitized audio input back to sender's system 500 (step 534). Speech processing module 220 is hosted on sender's system 500. Sender's system 500 receives the digitized audio (step 536), and compares the received response with the desired response (step 330) and proceeds with the procedure illustrated in FIG. 4 (steps 340–380), including executing the word matching and voice matching algorithms. Recipient's computer 520 can be a workstation, a mobile computer (e.g., a "laptop" computer), a PDA (personal digital assistant), or another type of programmed or programmable device.

Figure 6A:
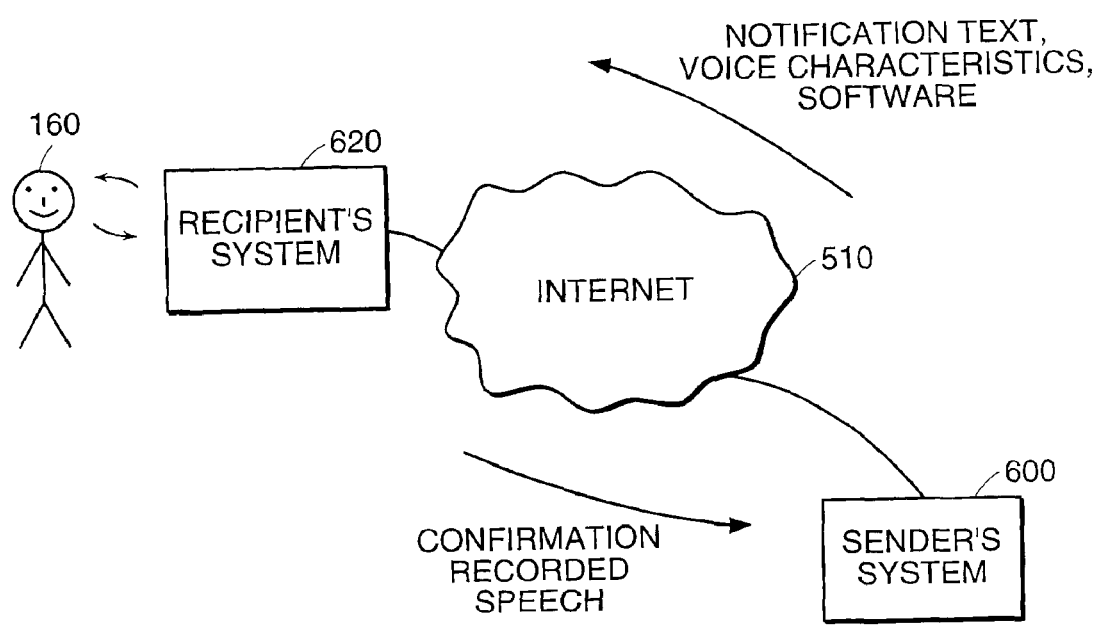
FIG. 6A is a block diagram of an embodiment that makes use of a data network in a client/server architecture.
Figure 6B:
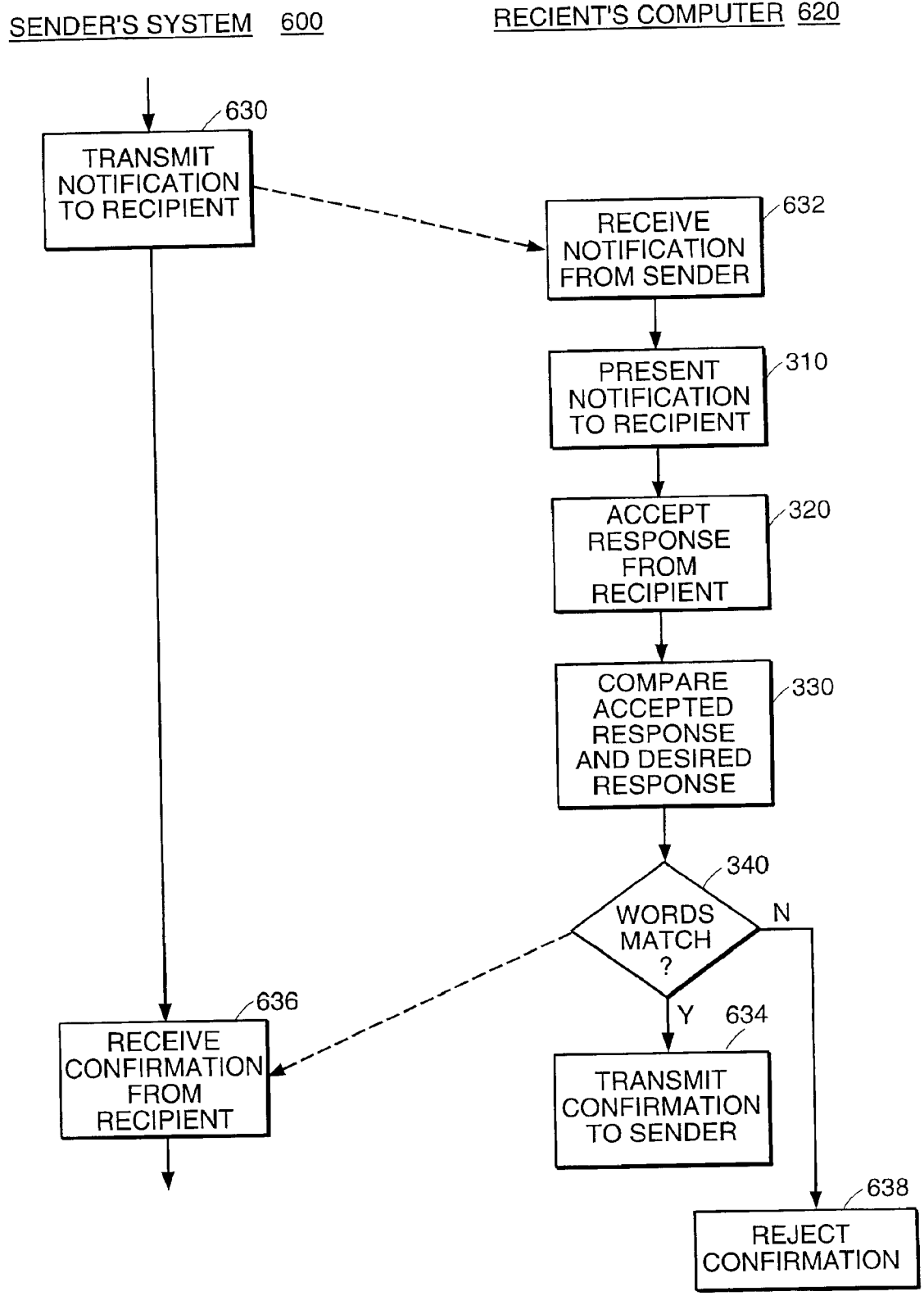
FIG. 6B is a flowchart of operation in a client/server architecture.

Referring to FIGS. 6A–B, in yet another distributed embodiment, a sender's system 600 is also coupled to a recipient's system over a data channel, such as over Internet 510. In this embodiment, speech processing module 220 is hosted on recipient's system 620 rather than on sender's system 600. Referring to the flowchart in FIG. 6B, sender's system 600 sends the notification text, and optionally voice characteristics for the intended recipient to the client's system (step 630). Software to execute the speech processing module is either already resident on the client's system, or is downloaded along with the notification text. For example, this software can be downloaded as an "applet" for execution in the context of a Web browser application that executes at the client's system. Recipient's system 620 receives the notification and optional software (step 632). After the notification text is presented to recipient 160 (step 310), speech processing module 220 executes at recipient's system 620, performing steps of accepting the response from the recipient (step 320) and comparing the response to the desired response (step 330). If the response matches (step 340), recipient's computer 620 sends a confirmation back to the sender's system (step 634) where it is received (step 636). If the responses do not match, then the notification is rejected (step 638) and typically a rejection is sent back to the sender's system.

Figure 7:
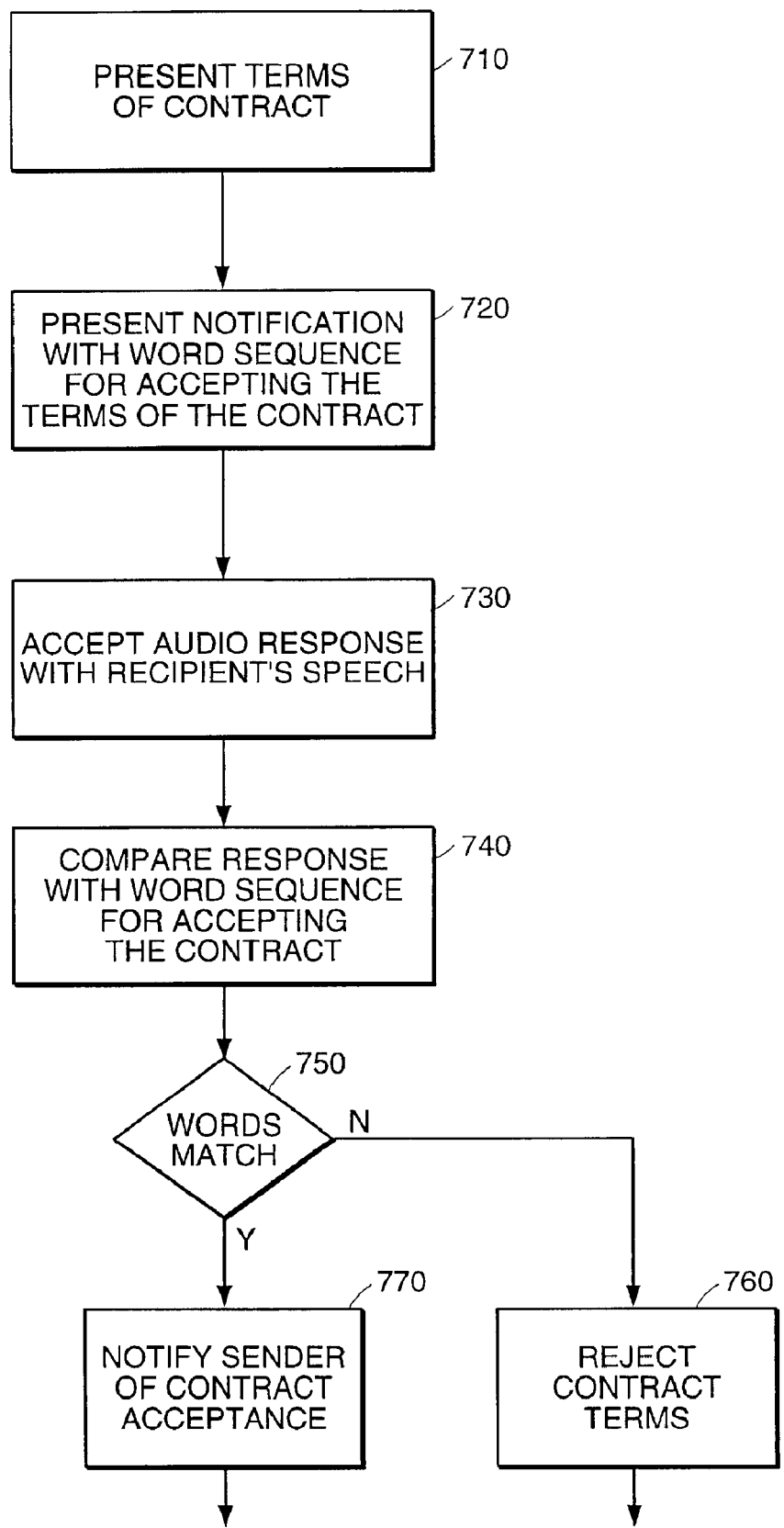
FIG. 7 is a flowchart of contract formation according to the invention.

The above embodiments are applicable to a number of applications. For example, referring to FIG. 7, the approach is used to enter into a contract between the sender and the intended recipient. The intended recipient is instructed to confirm receipt of the notification in order to accept terms of a contract offered by the sender. The notification text itself may include the terms of the contract, or the terms may be provided in conjunction with the notification text. Accepting terms of a license agreement, for example a software license agreement is an example of such a contract. The recipient acknowledges acceptance of the license by speaking the notification text, thereby forming the contract.

Another application involves delivery of safety warnings. For example, an operator of a dangerous device or system may occasionally receive safety warnings regarding safe operation of the device or system from an entity responsible for its safe operation. In order that the sender of the warning can be certain that the operator received the warning, the confirmation approach described above is used. In such an application, a processor can optionally be deployed at the device or system to host the speech processing module, or alternatively, the voice response from the device is passed from the device to the sender's system where it is processed.

In another application, an employee or agent of an employer may have to acknowledge receipt of policies or procedures regarding handling of material or data before that material or data is provided to him or her. For example, such a policy or procedure may relate of handling information associated with a government security classification. The recipient must confirm receipt of the policy or procedure before the classified information is provided to him or her. A recording of the recipients confirmation provides further evidence that the recipient acknowledged that they were aware of the policy or procedure before accepting the information.

Another application involves training or remedial education. In this application, the recipient is presented with a series of passages to read, and the system progresses from passage It is to be understood that the foregoing description is intended to illustrate and not to limit the scope of the invention, which is defined by the scope of the appended claims. Other embodiments are within the scope of the following claims.

What is claimed is:

1. A method for confirming that a predetermined recipient of an electronically transmitted word sequence has received and read the word sequence, comprising:

storing voice characteristic data of the predetermined recipient;

receiving by the predetermined recipient the word sequence from a sender of the word sequence;

presenting the word sequence to the predetermined recipient;

accepting an audio input from the predetermined recipient in response to presenting the word sequence;

determining whether the accepted audio input includes the predetermined recipient speaking the presented word sequence;

comparing the voice characteristic data to the accepted audio input to determine if the accepted audio input substantially matches the voice characteristic data; and if the accepted audio input matches the presented word sequence and substantially matches the voice characteristic data, transmitting a confirmation to the sender of the word sequence, indicating that the predetermined recipient has received and read the presented word sequence.

2. The method of claim 1 wherein presenting the word sequence to the predetermined recipient includes presenting a graphical representation of the word sequence.

3. The method of claim 2 wherein presenting the graphical representation of the word sequence includes presenting said graphical representation on a display.

4. The method of claim 1 wherein presenting the word sequence to the predetermined recipient includes presenting an audible representation of the word sequence.

5. The method of claim 4 wherein presenting the audible representation of the word sequence includes playing a stored audio recording of the word sequence.

6. The method of claim 4 wherein presenting the audible representation of the word sequence includes applying a speech synthesis algorithm to the word sequence to form the audible representation.

7. The method of claim 4 wherein presenting the audible representation of the word sequence includes transmitting the audible representation over a telephone network and accepting the audio input includes transmitting the audio input over the telephone network.

8. The method of claim 1 wherein determining whether the accepted audio input includes the predetermined recipient speaking the word sequence includes applying a speech recognition algorithm to the accepted audio input.

9. The method of claim 8 wherein applying the speech recognition algorithm includes computing a resulting word sequence from the audio input and determining whether the audio input includes the predetermined recipient speaking the word sequence includes comparing the resulting word sequence to the word sequence received by the predetermined recipient.

10. The method of claim 8 wherein applying the speech recognition algorithm includes time-aligning the presented word sequence and the audio input.

11. The method of claim 8 wherein applying the speech recognition algorithm includes computing a match score characterizing a similarity between the presented word sequence and the audio input.

12. The method of claim 11 wherein determining whether the audio input includes the predetermined recipient speaking the presented word sequence includes comparing the match score with a threshold score.

13. The method of claim 1 wherein accepting the audio input includes accepting a plurality of segments of the audio input each associated with a different part of the presented word sequence, and wherein determining whether the accepted audio input includes the predetermined recipient speaking the presented word sequence includes determining whether each of the plurality of segments of the audio input includes the predetermined recipient speaking the associated part of the presented word sequence.

14. The method of claim 13 wherein presenting the word sequence includes presenting each of the different parts of the word sequence in turn and accepting the audio input associated with that part before presenting another of the different parts.

15. Software stored on computer readable media for causing a computer system to perform functions including:

storing voice characteristic data of a predetermined recipient;

receiving, by the predetermined recipient, a word sequence from a sender of the word sequence;

presenting the word sequence to the predetermined recipient;

accepting an audio input from the predetermined recipient in response to presenting the word sequence;

determining whether the accepted audio input includes the predetermined recipient speaking the presented word sequence;

comparing the voice characteristic data to the accepted audio input to determine if the accepted audio input substantially matches the voice characteristic data; and if the accepted audio input matches the presented word sequence and substantially matches the voice characteristic data, transmitting a confirmation to the sender of the word sequence, indicating that the predetermined recipient has received and read the presented word sequence.

16. An automated notification confirmation system comprising:

means for storing voice characteristic data of a predetermined recipient;

means for receiving, by the predetermined recipient, a word sequence from a sender of the word sequence;

means for presenting the word sequence to the predetermined recipient;

means for accepting an audio input from the predetermined recipient in response to presenting the word sequence;

means for determining whether the accepted audio input includes the predetermined recipient speaking the presented word sequence;

means for comparing the voice characteristic data to the accepted audio input to determine if the accepted audio input substantially matches the voice characteristic data; and means for transmitting a confirmation to the sender of the word sequence, indicating that the predetermined recipient has received and read the presented word sequence, if the accepted audio input matches the presented word sequence and substantially matches the voice characteristic data.

* * * * *